US008837788B2

(12) United States Patent
Hudgins (10) Patent No.: US 8,837,788 B2
(45) Date of Patent: Sep. 16, 2014

(54) DISRUPTION OF FACIAL RECOGNITION SYSTEM

(76) Inventor: J. Stephen Hudgins, Blacksburg, VA (US)

( * ) Notice: Subject to any disclaimer, the term of this patent is extended or adjusted under 35 U.S.C. 154(b) by 128 days.

(21) Appl. No.: 13/488,022

(22) Filed: Jun. 4, 2012

(65) Prior Publication Data

US 2013/0322706 A1 Dec. 5, 2013

(51) Int. Cl.
*G06K 9/00* (2006.01)

(52) U.S. Cl.
CPC .................................... *G06K 9/00* (2013.01)
USPC ........... 382/118; 382/103; 382/195; 362/104; 362/106

(58) Field of Classification Search
CPC .......... G06K 9/00275; G06K 9/00281; G06K 9/746; G06K 9/00597; G06K 9/4614; G06T 2207/20132; G06T 2207/30201; H04N 5/23219; H04N 5/23229; A61F 9/04; G02B 2027/0138
USPC ................... 382/201, 149, 103; 358/296, 528
See application file for complete search history.

(56) References Cited

U.S. PATENT DOCUMENTS

| 4,113,353 | A | * | 9/1978 | Matsushita .................... 359/636 |
| 4,758,062 | A | * | 7/1988 | Sunagawa et al. ................. 385/8 |
| 6,296,364 | B1 | | 10/2001 | Day et al. |
| 6,578,981 | B2 | | 6/2003 | Jackson et al. |
| 6,612,696 | B2 | | 9/2003 | Waters |
| 6,824,265 | B1 | | 11/2004 | Harper |
| 7,104,948 | B2 | | 9/2006 | Kaizuka |
| 7,393,113 | B2 | | 7/2008 | Damrau |
| 7,438,027 | B1 | * | 10/2008 | Hinderks ..................... 123/43 R |
| 7,477,309 | B2 | * | 1/2009 | Cuccias ......................... 348/342 |
| 7,769,203 | B2 | * | 8/2010 | Oohashi et al. ............... 382/103 |

(Continued)

FOREIGN PATENT DOCUMENTS

| BR | 9900243 | 8/2000 |
| DE | 102004049139 | 4/2005 |
| JP | 2007209585 | 8/2007 |

OTHER PUBLICATIONS

Yamada et al.,'Enhancement of Method for Preventing Illegal Recording of Movies to Enable It to Detect Cameras With Attached Infrared-Cut Filter', Acoustics, Speech and Signal Processing (ICASSP), 2012 IEEE International Confererence on, Mar. 25-30, 2012 See p. 1826, left column, lines 9-14, 18-23 and figure 1.

(Continued)

*Primary Examiner* — Vu Le
*Assistant Examiner* — Aklilu Woldemariam
(74) *Attorney, Agent, or Firm* — Douglas E. Jackson; Stites & Harbison PLLC (57) ABSTRACT

A method and apparatus allow an individual to disrupt recognition of facial characteristics of the individual by a facial recognition system. This is accomplished by providing an object which is worn adjacent the face of the individual. At least one infrared radiation emitter is fixed to the object which emits mostly or totally infrared radiation. The infrared radiation emitter is adjacent the face of the individual and directed at least one of onto the face or forward of the face of the user at all times, and hence as the face of the individual is viewed by the camera of the facial recognition system. As a result, an image of the face obtained by the facial recognition system is substantially different from an image which would have been obtained were the infrared radiation not so emitted, so that determination of facial characteristics by the facial recognition system is disrupted.

20 Claims, 5 Drawing Sheets

(56) References Cited

U.S. PATENT DOCUMENTS

| | | | |
|---|---|---|---|
| 7,817,826 B2 | 10/2010 | Chen | |
| 7,949,245 B2 | 5/2011 | Lvovsky et al. | |
| 8,282,234 B2 * | 10/2012 | VanDerWoude et al. | 362/106 |
| 8,369,579 B2 * | 2/2013 | Frigerio | 382/107 |
| 2004/0081338 A1 | 4/2004 | Takenaka | |
| 2005/0063569 A1 * | 3/2005 | Colbert et al. | 382/118 |
| 2005/0201715 A1 * | 9/2005 | Ellwood, Jr. | 385/147 |
| 2006/0047515 A1 * | 3/2006 | Connors | 704/270 |
| 2006/0197840 A1 | 9/2006 | Neal et al. | |
| 2007/0291974 A1 | 12/2007 | Eisenbraun | |
| 2008/0130272 A1 | 6/2008 | Waters | |
| 2010/0080418 A1 | 4/2010 | Ito | |
| 2010/0183227 A1 | 7/2010 | Park et al. | |
| 2011/0013135 A1 | 1/2011 | Waters | |

OTHER PUBLICATIONS

Yamada et al., 'Preventing re-recording based on difference between sensory perceptions of humans and devices', Image Processing (ICIP), 2010 17th IEEE International Conference on, Sep. 26-29, 2010 See p. 993, right column, line 13—p. 996, left column, line 28.

International Search Report and Written Opinion of the International Searching Authority for International Application No. PCT/US2013/042632, Aug. 23, 2013, Korean Intellectual Property Office, Daejeon Metropolitan City, KR.

* cited by examiner

DISRUPTION OF FACIAL RECOGNITION SYSTEM

BACKGROUND OF THE INVENTION

Facial recognition technology has, at the time of filing of this application, mainly been used in the United States by various national security agencies and police forces. While there has been some limited uses of facial recognition technology in the private sector, these have been fairly limited. However, facial recognition technology has recently been incorporated in private security systems, such as those used for gambling casinos, in the production of Hollywood movies, and as a component in other software systems such as FACEBOOK, just to name a few of those applications. Fortunately, or unfortunately depending on one's perspective, technology prognosticators have predicted an explosion in products employing facial recognition technology in the fairly near future and long thereafter.

Facial recognition technology generally requires three functional components: a) an image, which is taken from a digital camera or a video frame taken from a video camera, or any other image taken by a suitable camera and which can be digitized; b) facial recognition software to analyze the acquired image; and c) a computer or other computational equipment needed to run the software and provide a database or link to a database. Because all three of these components are becoming increasingly powerful, cheaper, and smaller by the day, it is believed that facial recognition is no longer going to be primarily limited to governmental security functions but instead will find itself incorporated in a wide array of non-government activities and in particular commercial applications. One commercial application which is being developed is the customizable digital advertising billboard (video screen or display), which uses a camera to acquire an image of a potential viewer approaching the advertising billboard. Based on processing by a computer of this acquired image via now cheap hardware using facial recognition software, the advertising billboard then selects a particular advertisement suitable to some characteristic of the potential viewer. The characteristics can be general, such as gender, age, race, etc., or more specifically to an individual having some known shopping or buying habits. This customized advertisement is then projected to the video billboard for viewing by the approaching potential viewer. All of this is done in the second or two while the potential viewer is walking toward the advertising billboard, with the intent that the potential viewer will then notice the customized advertisement displayed which is selected according to the individual's recognized characteristic. Advertising systems such as this were vividly simulated in the movie "The Minority Report", where billboards customize themselves to the specific identity and likely interest of each passersby.

Other not quite so innocent applications which employ this same near instantaneous facial recognition may soon be found more and more often in our public and commercial environments.

Thus, while the legitimate security functions of government and police agencies should not be circumvented, there are many individuals that would desire not to have their identity automatically and surreptitiously determined in a non-security setting such as inside a shopping mall. Fortunately, facial recognition technology is still not foolproof. Obviously, if one wears a mask over one's face, or covers one's face with one's hand, or wears a fake nose and glasses, the recognition systems can be easily disrupted or defeated. However, most people would not desire to walk around with a sock cap pulled down over their face or with their hand or magazine held up in front of their face for this purpose. Thus, it would be useful to have a method or device which would not be obvious to passersby as a facial recognition disrupter, but which would mask ones appearance or facial characteristics generally as one passes by a facial recognition system.

BRIEF SUMMARY OF THE INVENTION

Thus, in accordance with the present invention, a method and an apparatus are provided which allow an individual to disrupt recognition of facial characteristics of the individual by a facial recognition system designed to determine one or more characteristics of a face of the individual when viewed by a camera of the facial recognition system. This is accomplished by providing an object which is adapted to be worn by the individual adjacent the face of the individual. At least one infrared radiation emitter is then fixed to the object, which the infrared radiation emitter emits mostly or totally infrared radiation. The object is then worn by the individual with the at least one infrared radiation emitter adjacent the face of the individual. The infrared radiation is directed from the at least one radiation emitter at least one of a) onto at least a surface portion of the face of the individual or b) forward of the face of the user at all times, and hence causing the infrared radiation from the at least one radiation emitter to be received by the camera of the facial recognition system as the face of the individual is viewed by the camera of the facial recognition system. As a result, an image of the face of the individual obtained by the camera of the facial recognition system is substantially different from an image which would have been obtained were the infrared radiation from the at least one radiation emitter not emitted onto at least one surface portion of the face or forward of the face of the user, so that determination of one or more facial characteristics of the individual by the facial recognition system is disrupted.

In one preferred embodiment, an intensity of the at least one infrared radiation emitter is varied. Alternatively or additionally, a direction of the at least one infrared radiation emitter is varied so that different surface portions of the face of the individual are illuminated. In another preferred embodiment, there is a shadow producing element which is located adjacent the infrared radiation emitter, which causes the infrared radiation emitter to project an infrared light shadow of the element onto the face of the individual together with the infrared radiation.

In still another preferred embodiment, a plurality of infrared radiation emitters are fixed to the object. Then, the intensity of the infrared radiation emitted by each of the plurality of the infrared radiation emitters changes over time and from each other. Alternatively or additionally, a direction of the infrared radiation emitted by each of the plurality of the infrared radiation emitters changes over time and from each other.

The object to which the infrared radiation emitters are fixed is conveniently one of a pair of glasses or glasses frame, a hat, an ear-mounted member, a necklace, or a wrist-mounted member.

It is an advantage of the present invention that an individual can change the appearance of a facial image as picked up by a camera of a facial recognition system without making the change apparent or noticeable to other passersby, and with this change thereby disrupt recognition of their facial characteristics by the facial recognition system.

It is also an advantage of the present invention that the object which is worn to disrupt the facial recognition system is a commonly worn object, so the use of the object to disrupt would also not be apparent to passersby.

Other features and advantages of the present invention are stated in or apparent from detailed descriptions of presently preferred embodiments of the invention found hereinbelow.

DETAILED DESCRIPTION OF THE INVENTION

Figure 1:
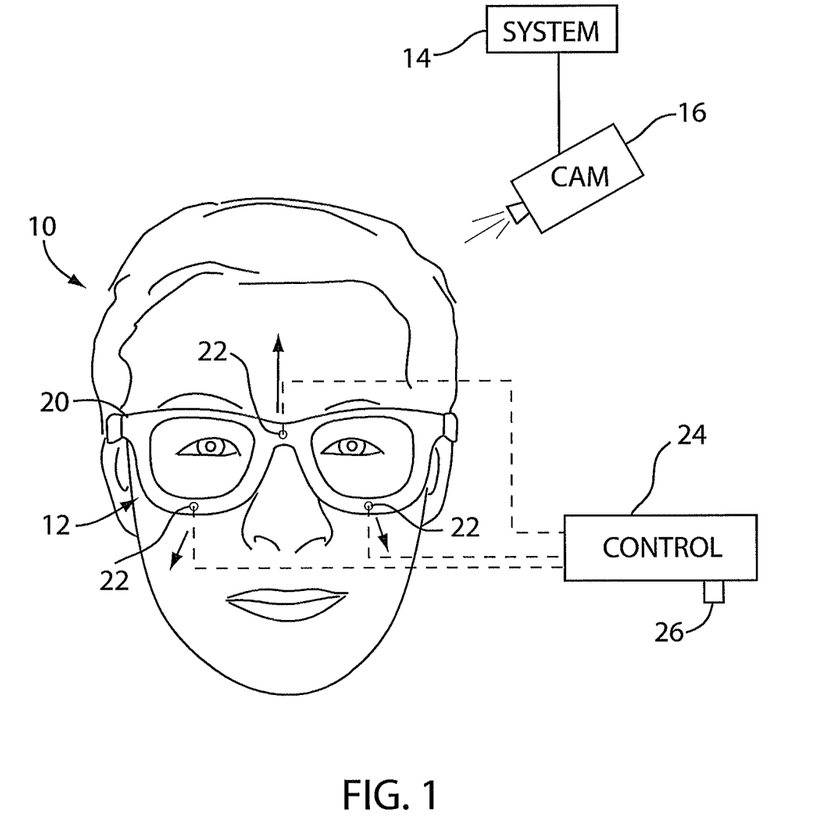
FIG. 1 is a schematic front elevation view of a pair of glasses or glasses frame used for facial recognition disruption in accordance with the present invention.

With reference now to the drawings in which like numerals represent like elements throughout the views, there is depicted in FIG. 1 a portion of an individual or user 10 and a device 12 which is worn by individual 10 in order to disrupt recognition of the facial characteristics of individual 10 by a typical facial recognition system 14. Facial recognition system 14 is designed to determine one or more characteristics of a face of individual 10, when the face is viewed by a camera 16 associated with facial recognition system 14. As appreciated by those of ordinary skill in the art, facial recognition system 14 has suitable facial recognition software and hardware provided in a computer (not separately shown) to run the software.

It will also be appreciated, as well known in the art, that one typical method of facial recognition utilizes a facial recognition system 14 that generally takes an image of the face of individual 10 with camera 16 and assigns nodal points to different anatomical points on the face in the image. Facial recognition system 14 then makes measurements of the various distances between these nodal points, and reduces the imaged face to a series of measurements which is sometimes called the faceprint. These coded measurements can then be compared to other entries in a database of facial recognition system 14 to see if there is a match, and thereby determine at least certain characteristics of the face of individual 10 represented in the image. The approach of this and other such facial recognition systems may be to determine the exact identity of a specific person, or to determine more generic data such as gender, age, and even ethnicity of the facial image obtained and processed. Whatever the specifics of the technology of recognition employed by facial recognition system 14, such recognitions can all be disrupted by changing the image that represents the input into the software and hardware of facial recognition system 14.

As noted above, while an individual 10 can obscure one's face by a mask or object in front thereof to defeat facial recognition system 14, generally most individuals would not desire to move around in public spaces or the like in such a condition. It is thus an aspect of the present invention that an individual 10 can change their facial image as picked up by camera 16 of facial recognition system 14 without making the change apparent or noticeable to other passersby, and with this change thereby disrupt recognition of their facial characteristics by facial recognition system 14. Device 12 accomplishes this because most of the images acquired by facial recognition technology come either from digital cameras or frames from digital video systems. Fortunately, the spectral sensitivities of most digital cameras or digital video systems differ from the spectral sensitivity of the human eye. In particular, in typical systems such as facial recognition system 14, the spectral sensitivity of digital camera 16 is broader than that of the human eye in the infrared end of the spectrum. In other words, a source of light in the near infrared end of the spectrum is seen and registered by a digital camera but is invisible to the human eye. In fact, typical digital still cameras and video cameras, because of their increased sensitivity in the infrared end of the spectrum as compared to the human eye, record an image which is the sum of both the visible light and the light that is present in the near infrared end of the spectrum. By comparison, the human eye only sees light that is in the visible spectrum.

Device 12 provides the desired disruption while being relatively un-noticed by being a relatively common object 20 which is typically and expectedly worn by individual 10 adjacent the face of individual 10. Object 20 then includes at least one infrared radiation emitter 22, and preferably a plurality such as three (or more as desired) infrared radiation emitters 22 as shown in FIG. 1. Conveniently, such infrared radiation emitters would be LEDs or the like, or more sophisticated infrared sources as desired or needed and as well known in the art.

In this embodiment, common object 20 is a pair of glasses or the like, which can be ornamental as well if desired. It will be appreciated that object 20 has a sufficient extent over or around the face of the user to provide room for spaced infrared radiation emitters 22 as shown. Each infrared radiation emitter 22 is fixed to object 20 such that, when object 20 is worn by individual 10, the or each infrared radiation emitter 22 directs infrared radiation emitted thereby primarily toward at least a surface portion of (or the whole of) the face of individual 10 at all times. Consequently, whenever the face of individual 10 is viewed by camera 16 of facial recognition system 14, the image obtained of the face is disrupted (washed out, or features highlighted in unusual manners) by the infrared radiation impinging on the face.

Object 20 includes a control 24 fixed thereto as well and which is preferably hidden from view or at least not readily noticeable as such; though control 24 could be located remote from object 20 if desired. For example, control 24 could be located as part of one or both earpieces. Control 24 includes a battery (not shown) and an on/off switch 26 which switch 26 at least controls the on/off activation of the plurality of infrared radiation emitters 22 so that individual 10 can turn off device 12 when not in use. Each infrared radiation emitter 22 is a source of fairly bright light primarily or preferably exclusively in the infrared end of the light spectrum, which light is either not seen (if all infrared) or only minimally appreciated (if some light is not infrared) by the human eye but which light is fairly bright to a digital camera.

In operation, when object 20 is worn by individual 10 and infrared radiation emitter 22 fixed thereto is turned on, emitted infrared radiation is directed onto at least a surface portion of the face of individual 10 as shown. As a result of this infrared radiation, an (disrupted) image of the face of individual 10 obtained by camera 16 of facial recognition system 14 is substantially different from a normal image which would have been obtained using the usual or expected ambient light (typically coming from above, as in a shopping mall) and which normal image would be without the infrared radiation from infrared radiation emitters 22 now emitted onto at least the surface portion of the face. Thus, with this substantially different (disrupted) image, determination of one or more facial characteristics of individual 10 by the facial recognition system 14 is significantly and satisfactorily disrupted. However, the appearance of individual 10 to other individuals nearby is not changed or noticeable, since the emitted radiation is mostly or totally in the infrared region of the light spectrum.

Figure 2A:
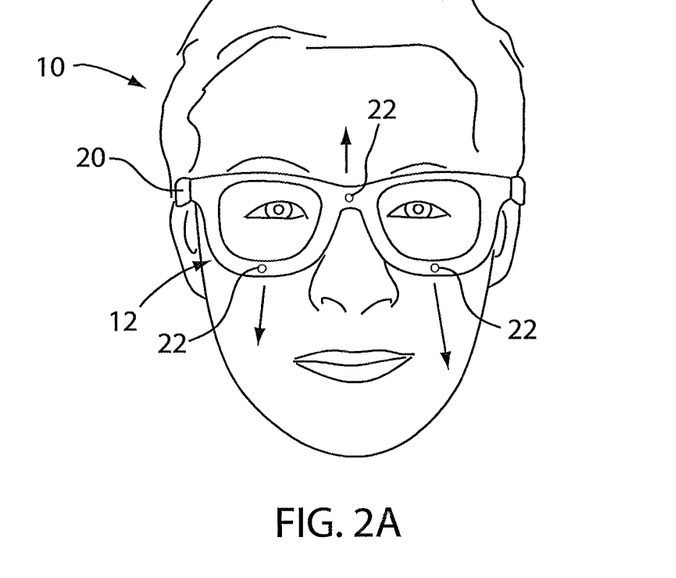
FIGS. 2A and 2B are schematic front elevation views of a pair of glasses or glasses frame depicted in FIG. 1 but with particular operational characteristics being employed.
Figure 2B:
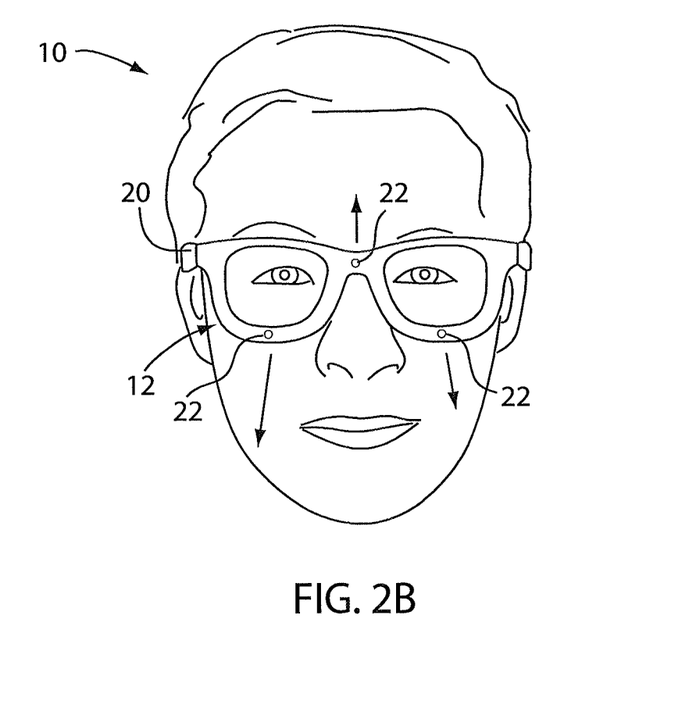

In a preferred embodiment, control 24 also includes a circuit (not shown) which controls an intensity of each infrared radiation emitter 22. Such circuits are well known in the art of novelty lighting devices and the like. With such an intensity control circuit, a variable intensity, shown by the length of the associated arrows of each infrared radiation emitter 22 in FIGS. 2A-B, can change from brightest to dimmest over any set, or variably set, time period. For defeating recognition systems using video cameras, the time period could be set at equal to or greater than the frame rate; while for successive pictures taken by a still camera, the time period could be set at much lower rates. Thus, as shown in FIG. 2A, at one instant the rightmost infrared radiation emitter 22 can be brightest; and then later as shown in FIG. 2B, the left infrared radiation emitter 22 can be the brightest (and with corresponding intensities of the other infrared radiation emitters 22). Instead of a variable intensity, a short blinking or twinkling period for each infrared radiation emitter 22 can be provided, as also well known in the art.

Besides varying in intensity as noted above, infrared radiation emitters 22 can alternatively or additionally vary by direction over similar time periods or completely different time periods as desired.

Figure 3:
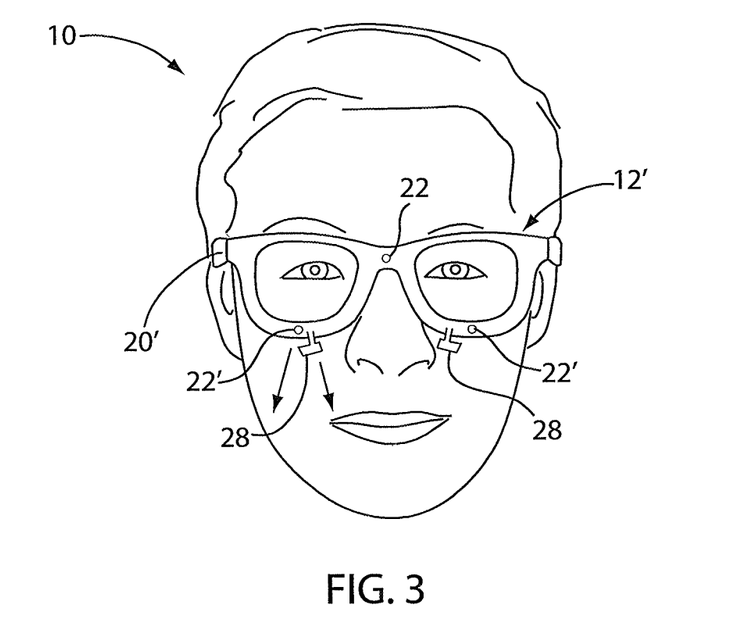
FIG. 3 is a schematic front elevation view of a modified pair of glasses or glasses frame similar to that depicted in FIG. 1.

In another preferred embodiment depicted in FIG. 3, left and right infrared radiation emitters 22' have a small (not on the scale depicted, but on the scale of emitters 22) shadow producing element 28 mounted to object 20' so as to be in front of left and right infrared radiation emitters 22'. Shadow elements 28 thus block some of the infrared radiation emitted by left and right infrared radiation emitters 22', so that shadows lacking infrared radiation are created on the face of individual 10 which is otherwise being bathed in infrared radiation. Such shadows would then further disrupt recognition of the facial characteristics of individual 10 by facial recognition system 14.

Figure 4:
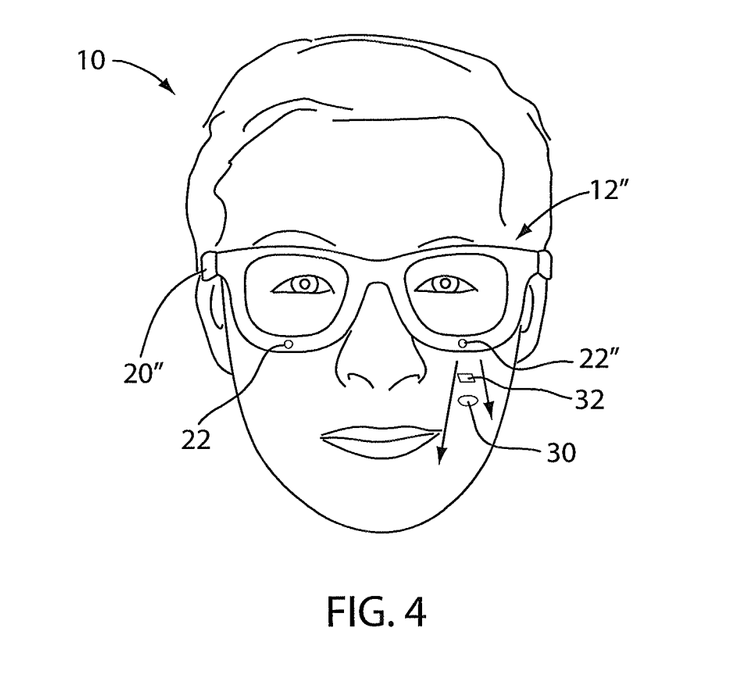
FIG. 4 is a schematic front elevation view of another modified pair of glasses or glasses frame similar to that depicted in FIG. 1.

In still another preferred embodiment depicted in FIG. 4, a special infrared radiation emitter 22" (or both emitters if desired) is provided on object 20". Then, as schematically depicted, a lens 30 and a transparency 32 (not on the scale depicted, but on the scale of emitter 22" and preferably integral therewith) are mounted in front of infrared radiation emitter 22". The transparency 32 includes some pattern or image thereon, which is thus projected onto the face of individual 10 as shadows and bright portions to further obscure the features of the face in any image picked up by a digital camera or the like of facial recognition system 14.

Besides providing infrared radiation emitters on an object such as eyeglass frames or the like, various other commonly worn objects could be used in accordance with the present invention. Thus, shown in the FIGS. 5-8 are the following other exemplary embodiments.

Figure 5:
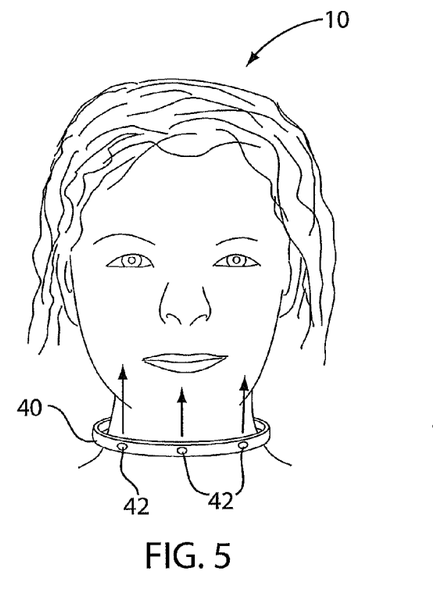
FIG. 5 is a schematic front elevation view of a necklace modified for use for facial recognition disruption in accordance with the present invention.

FIG. 5 shows a necklace, loop or the like 40 which is worn by an individual and which have infrared radiation emitters 42 fixed thereon which direct infrared light as shown onto the face of the individual. Preferably, necklace 40 is ornamental as well, so as to be more acceptable or desirable for wearing by individual 10 and to be less noticeable as anything other than a common necklace and hence not noticeable as a source of infrared radiation to passersby. Necklace 40 has a circumference sufficient to space infrared radiation emitters 42 away from the neck of individual 10 somewhat as shown in order to more completely direct infrared radiation onto the face of the individual.

Figure 6:
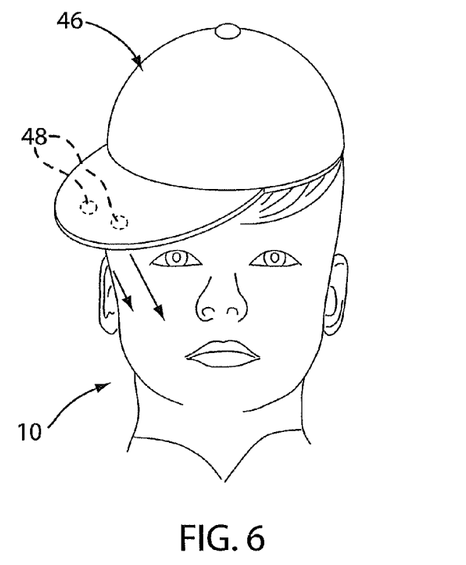
FIG. 6 is a schematic front elevation view of a hat modified for use for facial recognition disruption in accordance with the present invention.

FIG. 6 shows a ball cap 46 or other such hat which is worn by an individual and which has infrared radiation emitters 48 fixed thereon which direct infrared light as shown onto the face of the individual.

Figure 7:
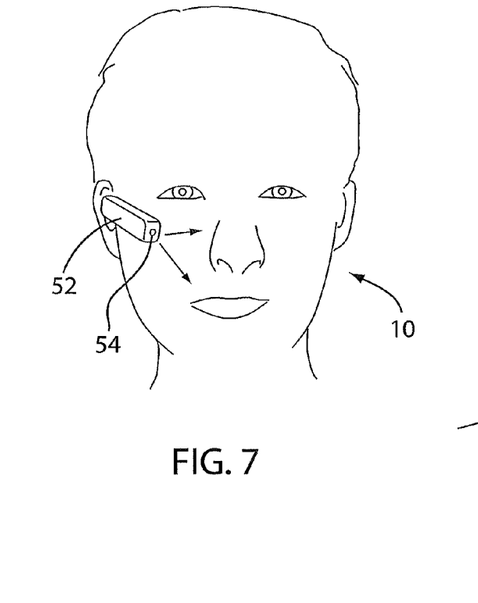
FIG. 7 is a schematic front elevation view of a earpiece modified for use for facial recognition disruption in accordance with the present invention.

FIG. 7 shows an earpiece 52 such as for a hands free (BLUETOOTH-like) ear phone or the like which is worn by an individual and which has an infrared radiation emitter 54 fixed thereon which directs infrared light as shown onto the face of the individual.

Figure 8:
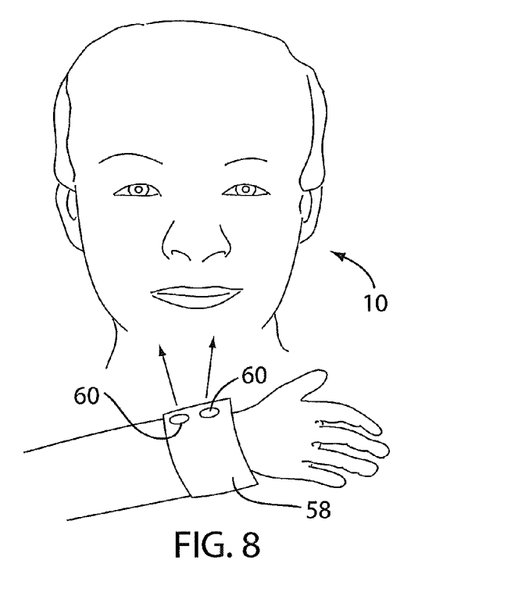
FIG. 8 is a schematic front elevation view of a wrist-mounted member modified for use for facial recognition disruption in accordance with the present invention.

FIG. 8 shows a wrist-mounted member 58 such as a wristband or a watch which is worn by an individual and which has infrared radiation emitters 60 fixed thereon. In this embodiment, it is necessary for the individual to raise their wrist to be closer to the face whenever it is desired to avoid a facial recognition system 14 by shining infrared radiation sufficiently onto their face.

Figure 9:
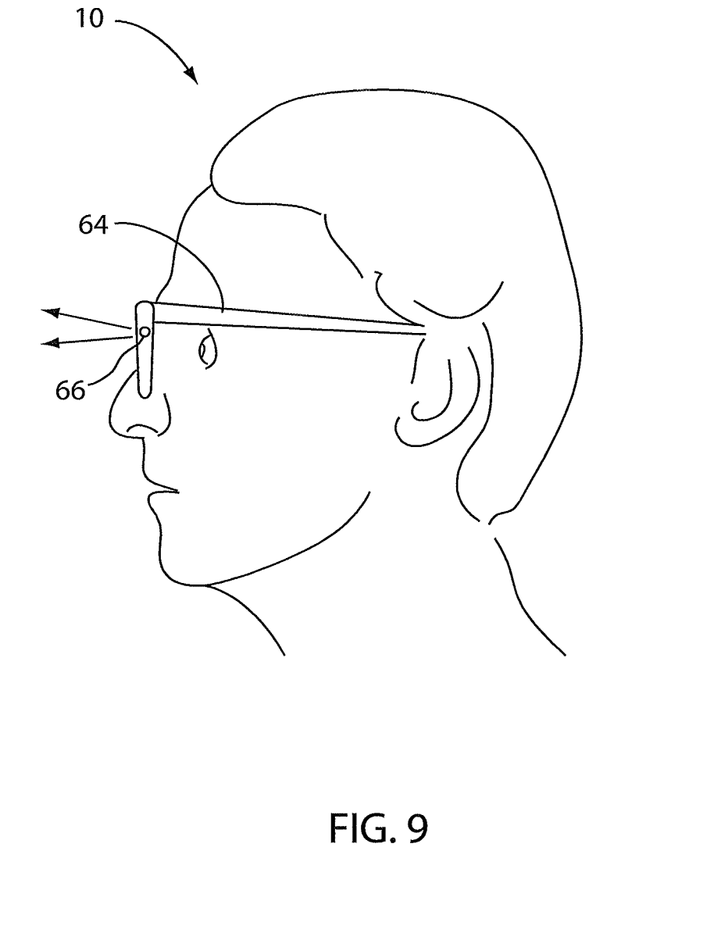
FIG. 9 is a schematic side view of a pair of glasses or glasses frame with a forward facing light source in accordance with the present invention.

FIG. 9 shows one side of a glasses frame 64 with a forward directed infrared radiation emitter 66. The infrared radiation from radiation emitter 66 (preferably one of two to four on glasses frame 64) is then received directly by the camera of the facial recognition system as the facial recognition system also views the face of individual 10, so that the overall image of the face of the individual obtained by the camera of the facial recognition system is substantially different from an image which would have been obtained were the infrared radiation from the at least one radiation emitter not emitted and directly received, so that determination of one or more facial characteristics of the individual by the facial recognition system is disrupted.

While the present invention has been described with respect to exemplary embodiments thereof, it will be understood by those of ordinary skill in the art that variations and modifications can be effected within the scope and spirit of the invention.

I claim:

1. A method for an individual to disrupt recognition of their facial characteristics by a facial recognition system, said method comprising the steps of:
    providing an object which is adapted to be worn by the individual adjacent their face;
    fixing at least one infrared radiation emitter to the object, where the infrared radiation emitter emits mostly infrared radiation;
    wearing of the object by the individual with the at least one infrared radiation emitter adjacent their face; and
    at least one of directing the infrared radiation from the at least one radiation emitter a) onto at least a surface portion of the face of the individual, or b) forward of the face of the individual at all times, and said directing step including the step of causing the infrared radiation from the at least one radiation emitter to be received by a camera of the facial recognition system as the face of the individual is viewed by the camera, whereby an image of the face of the individual obtained by the camera is substantially different from an image which would have been obtained were the infrared radiation from the at least one radiation emitter not directed according to the directing step, so that determination of one or more facial characteristics of the individual by the facial recognition system is disrupted.

2. A method for an individual to disrupt recognition of facial characteristics as claimed in claim 1, wherein said directing step includes the step of varying an intensity of the at least one infrared radiation emitter.

3. A method for an individual to disrupt recognition of facial characteristics as claimed in claim 1, wherein said directing step includes the step of varying a direction of the at least one infrared radiation emitter so that different surface portions of the face of the individual are illuminated.

4. A method for an individual to disrupt recognition of facial characteristics as claimed in claim 1, wherein said directing step includes the step of locating a shadow producing element adjacent the infrared radiation emitter which causes the infrared radiation emitter to project an infrared light shadow of the element onto the face of the individual together with the infrared radiation.

5. A method for an individual to disrupt recognition of facial characteristics as claimed in claim 1, wherein said fixing step includes the step of fixing a plurality of infrared radiation emitters to the object.

6. A method for an individual to disrupt recognition of facial characteristics as claimed in claim 5, wherein said directing step includes the step of changing an intensity of the infrared radiation emitted by each of the plurality of the infrared radiation emitters over time and from each other.

7. A method for an individual to disrupt recognition of facial characteristics as claimed in claim 5, wherein said directing step includes the step of changing a direction of the infrared radiation emitted by each of the plurality of the infrared radiation emitters over time and from each other.

8. A device which is worn by an individual to disrupt recognition of their facial characteristics by a facial recognition system, said device comprising:
  an object which is worn by the individual adjacent the their face;
  at least one infrared radiation emitter which emits mostly infrared radiation, said at least one infrared radiation emitter being fixed to said object such that, when said object is worn by the individual, said at least one infrared radiation emitter directs infrared radiation primarily in a direction which is one of a) toward at least a surface portion of the face of the individual or b) forward of the face of the individual at all times, and hence whenever the face of the individual is viewed by a camera of the facial recognition system;

whereby an image of the face of the individual obtained by the camera is substantially different from an image which would have been obtained were the infrared radiation from the at least one radiation emitter not emitted, so that determination of one or more facial characteristics of the individual by the facial recognition system is disrupted.

9. A device worn by an individual to disrupt recognition as claimed in claim 8, wherein said infrared radiation emitter varies in intensity.

10. A device worn by an individual to disrupt recognition as claimed in claim 8, wherein said infrared radiation emitter varies in direction.

11. A device worn by an individual to disrupt recognition as claimed in claim 8, further including a shadow producing element located adjacent said infrared radiation emitter which causes said infrared radiation emitter to project a shadow of the element on the face of the individual together with the infrared radiation.

12. A device worn by an individual to disrupt recognition as claimed in claim 8, wherein there are a plurality of said infrared radiation emitters fixed to said object.

13. A device worn by an individual to disrupt recognition as claimed in claim 12, wherein said plurality of said infrared radiation emitters differ over time and from each other in an intensity of the infrared radiation emitted thereby.

14. A device worn by an individual to disrupt recognition as claimed in claim 12, wherein said plurality of said infrared radiation emitters differ over time and from each other in a direction of the infrared radiation emitted thereby.

15. A device worn by an individual to disrupt recognition as claimed in claim 8, wherein said object is a pair of glasses.

16. A device worn by an individual to disrupt recognition as claimed in claim 8, wherein said object is a necklace.

17. A device worn by an individual to disrupt recognition as claimed in claim 8, wherein said object is a hat.

18. A device worn by an individual to disrupt recognition as claimed in claim 8, wherein said object is an ear-mounted member.

19. A device worn by an individual to disrupt recognition as claimed in claim 8, wherein said object is a wrist-mounted member.

20. A device worn by an individual to disrupt recognition as claimed in claim 8, wherein said object is a pair of glasses and said at least one infrared radiation emitter directs infrared radiation primarily toward at least a surface portion of the face of the individual.

* * * * *